United States Patent
Yakame

(10) Patent No.: US 10,467,167 B2
(45) Date of Patent: Nov. 5, 2019

(54) INFORMATION PROCESSING DEVICE, EXTENSION UNIT, AND INFORMATION PROCESSING SYSTEM

(71) Applicant: Fujitsu Client Computing Limited, Kanagawa (JP)

(72) Inventor: Hirotaka Yakame, Kawasaki (JP)

(73) Assignee: Fujitsu Client Computing Limited, Kanagawa (JP)

( * ) Notice: Subject to any disclaimer, the term of this patent is extended or adjusted under 35 U.S.C. 154(b) by 344 days.

(21) Appl. No.: 15/358,235

(22) Filed: Nov. 22, 2016

(65) Prior Publication Data

US 2017/0161221 A1   Jun. 8, 2017

(30) Foreign Application Priority Data

Dec. 8, 2015   (JP) .................................. 2015-239523

(51) Int. Cl.
  *G06F 13/40*   (2006.01)
  *G06F 1/16*    (2006.01)
  *G06F 1/18*    (2006.01)

(52) U.S. Cl.
  CPC ........ *G06F 13/4022* (2013.01); *G06F 1/1632* (2013.01); *G06F 1/189* (2013.01)

(58) Field of Classification Search
  CPC ..... G06F 13/4022; G06F 1/1632; G06F 1/189
  See application file for complete search history.

(56) References Cited

U.S. PATENT DOCUMENTS

| 5,886,424 A | * | 3/1999 | Kim | ...................... G06F 1/1632 |
| | | | | 307/23 |
| 2009/0167539 A1 | * | 7/2009 | Motoe | ................... G06F 1/1632 |
| | | | | 340/600 |
| 2017/0038810 A1 | * | 2/2017 | Ueki | ....................... G06F 21/44 |

FOREIGN PATENT DOCUMENTS

| JP | 10-069333 | 3/1998 |
| JP | 2002278655 A | 9/2002 |
| JP | 2009-157877 | 7/2009 |
| JP | 2009217774 A | 9/2009 |
| JP | 2013254408 A | 12/2013 |

(Continued)

OTHER PUBLICATIONS

Office Action issued in Japanese Application No. 2015-239523, dated Apr. 16, 2019 (7 pages).

*Primary Examiner* — Henry Tsai
*Assistant Examiner* — John B Roche
(74) *Attorney, Agent, or Firm* — Osha Liang LLP

(57) ABSTRACT

Diodes allow passage of electricity from a battery or a commercial power supply toward a processing system. A power feed reception terminal establishes a connection with a power feed reception path laid in a docking station or with a power feed reception path laid in another external device. Switches either cut off or connect paths meant for connecting the output sides of the diodes and the power feed reception terminal. A magnetic sensor detects the start of a connection between the power feed reception terminal and the power feed reception path laid in the docking station. When the start of a connection is detected, the control unit switches the switches to allow connection. When the power feed reception terminal is connected to the power feed reception path laid in the other external device, the control unit controls the switches based on the result of communication with the other external device.

8 Claims, 6 Drawing Sheets

(56) References Cited

FOREIGN PATENT DOCUMENTS

JP 2015212930 A 11/2015
WO 2014109789 A1 7/2014

\* cited by examiner

FIG.3

| | TABLET PC | | DOCKING STATION |
|---|---|---|---|
| | FET SWITCH 11 | FET SWITCH 12 | FET SWITCH 21 |
| WHEN NOT CONNECTED | OFF | OFF | OFF |
| WHEN CONNECTED | ON | ON | ON |

FIG.4

| | TABLET PC | | EXTENSION UNIT | |
|---|---|---|---|---|
| | FET SWITCH 11 | FET SWITCH 12 | FET SWITCH 51 | FET SWITCH 52 |
| WHEN NOT CONNECTED | OFF | OFF | OFF | OFF |
| WHEN CONNECTED TABLET PC SERVING AS SUPPLIER OF ELECTRICAL POWER | ON | OFF | OFF | ON |
| WHEN CONNECTED EXTENSION UNIT SERVING AS SUPPLIER OF ELECTRICAL POWER | OFF | ON | ON | OFF |

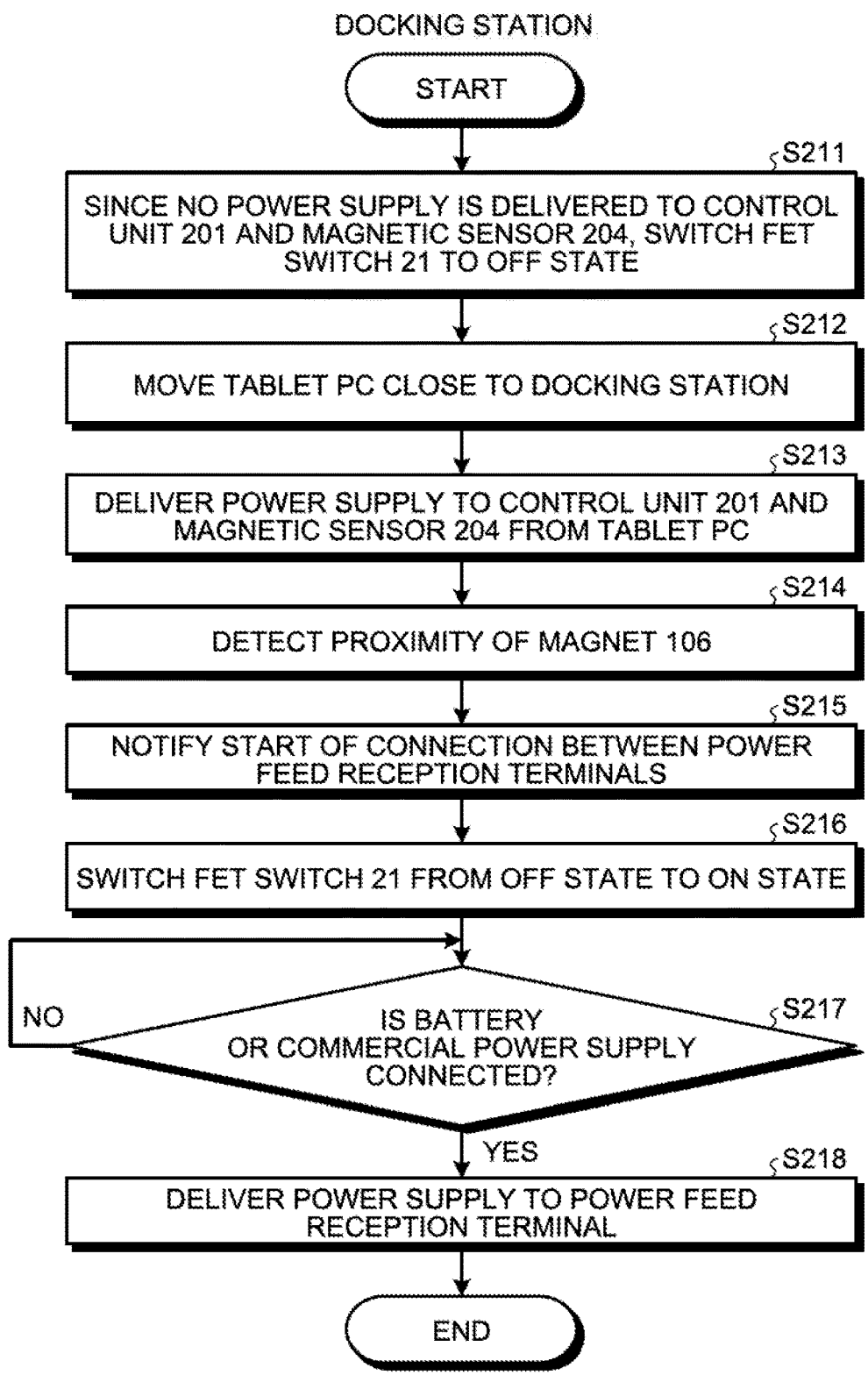

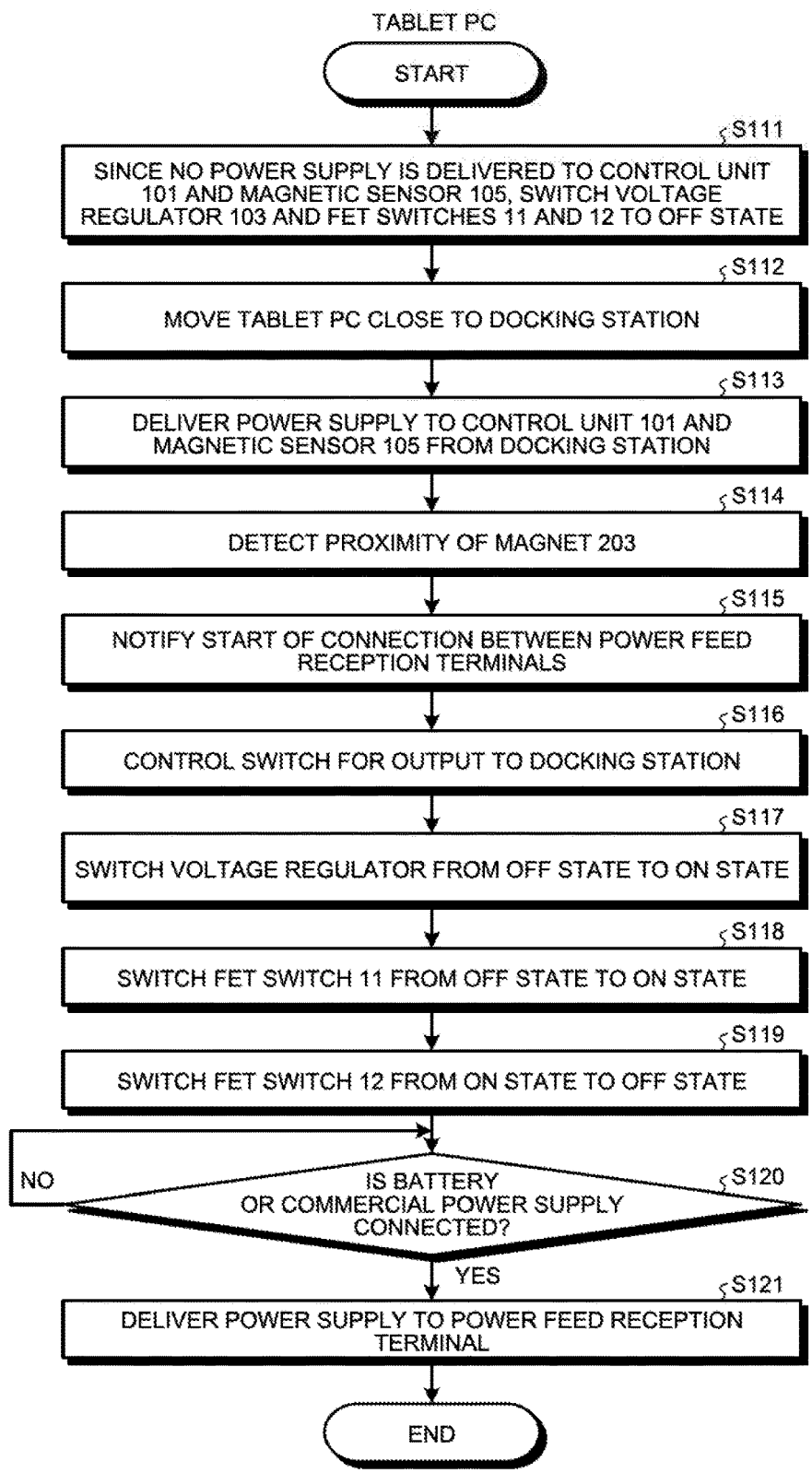

INFORMATION PROCESSING DEVICE, EXTENSION UNIT, AND INFORMATION PROCESSING SYSTEM

CROSS-REFERENCE TO RELATED APPLICATION

This application is based upon and claims the benefit of priority of the prior Japanese Patent Application No. 2015-239523, filed on Dec. 8, 2015, the entire contents of which are incorporated herein by reference.

FIELD

The embodiment discussed herein is related to an information processing device, an extension unit, and an information processing system.

BACKGROUND

Typically, in a compact information terminal such as a laptop personal computer (PC) or a tablet PC, an interface (I/F) connector is installed for the purpose of establishing connection with an extension unit such as a docking station that is meant for implementing the extension function. Examples of the I/F connector for the extension function include a display port, a high definition multimedia interface (HDMI: registered trademark), and an analog interface. Other examples of the I/F connector for the extension function include an RGB port (RGB stands for Red, Green, and Blue), a USB port (USB stands for Universal Serial Bus), and an audio port. Although dependent on the number of functions in an extension unit, the I/F connector for the extension function is typically of the size of about few tens of pins to few hundreds of pins. For that reason, in a compact information terminal, the I/F connector for the extension function becomes an obstacle in achieving downsizing and slimness.

In that regard, in recent years, in order to resolve the obstacle in achieving downsizing and slimness as attributed to the I/F connector for the extension function; it has been proposed to use a USB Type-C connector, which is the new USB standard, as the I/F connector for the extension function. A USB Type-C connector is a USB connector standard that is pluggable on the front side as well as the back side. Through a USB Type-C connector; USB signals, display port signals, audio port signals, and peripheral component interconnect express (PCIE) signals can be passed in a switching manner. Moreover, a USB Type-C I/F, according to the UPD standard (UPD stands for USB Power Delivery), is possible to handle up to 100 W at 5 V to 20 V.

In the case of using a USB Type-C connector as the I/F connector, a UPD controller is installed in the compact information terminal as well as in the extension unit. Then, once the compact information terminal and the extension unit are connected to each other, the UPD controllers installed therein perform communication with each other using configuration channel (CC) signals representing USB Type-C communication signals. Subsequently, an embedded controller (EC) that is installed in the compact information terminal as well as the extension unit uses an inter-integrated circuit (I2C) and reads the communication result that is recorded in the memory of the corresponding UPD controller. Then the ECs switch the switches of the display port, the USB port, the audio port, and the power supply port. As a result, the EC installed in the compact information terminal becomes able to control the transmission of signals to the extension unit and to control the delivery and the reception of power supply in the tablet PC.

Meanwhile, the power supply delivered to the compact information terminal and the extension unit not only can be used as the USB I/O power supply as in the conventional USB standard but can also be used as the power supply for running all functions of the tablet PC and the docking station. As far as the delivery of power supply is concerned, the tablet PC not only can be the supplier of electrical power to the docking station, but can also be the supply destination and can receive electrical power from the docking station. That is, in the USB Type-C standard, switching between power feeding from one device to another device connected by a USB cable and power feeding from the other device to the former device is done depending on the situation.

Meanwhile, if an AC power supply is being used in the docking station, in the case in which electrical power is supplied to the computer from the docking station but the power delivery from the AC power supply is lost, a conventional technology is available that enables delivery of the power supply in a battery to the docking station. Moreover, a conventional technology is available in which a magnetic sensor is used in determining whether or not an extension device and an electronic device are connected.

Patent Document 1: Japanese Laid-open Patent Publication No. 10-69333

Patent Document 2: Japanese Laid-open Patent Publication No. 2009-157877

However, for example, in the case in which a commercial power supply is connected to the compact information terminal and a battery is installed in the extension unit, and when the power supply is delivered from the compact information terminal to the extension unit; the following issues arise. That is, in this state, if the delivery of power supply from the commercial power supply to the compact information terminal is cut off, the delivery of power supply is switched to the delivery from the battery installed in the extension unit to the compact information terminal. However, in UPD, it is defined that, in the case of changing the supplier of electrical power, the voltage of the power supply line is to be once dropped to 0 V. For that reason, during the switching described above, the supplier of electrical power and the supply destination are switched only after the power supply to the compact information terminal is once cut off, and then the delivery of power supply to the compact information terminal is resumed. In that case, in the compact information terminal, since the power supply is once cut off, the user data being used during a task is at the risk of getting lost.

In that regard, if the USB Type-C standard is used, even in the case of implementing the conventional technology in which, when the delivery of power supply from the AC power supply is lost, the power supply from a battery is delivered to the docking station; the operation of switching the supplier of electrical power needs to be performed thereby making it difficult to continue the delivery of power supply without disruption. Moreover, even in the case of implementing the conventional technology in which a magnetic sensor is used in determining whether or not an extension device and an electronic device are connected, the switching of power supply is not taken into account thereby making it difficult to continue the delivery of power supply without interruption.

SUMMARY

According to an aspect of an embodiment, an information processing device includes: a diode that allows passage of electricity from a power supply, which is coupled with the information processing device, toward a load;

a power feed reception terminal that establishes a coupling the information processing device with a power feed reception path laid in a predetermined external device or with a power feed reception path laid in another external device; a switch that cuts off a path, which is meant for coupling an output side of the diode with the power feed reception terminal, or couples the output side of the diode with the power feed reception terminal; a detecting unit that detects start of a coupling the power feed reception terminal with the power feed reception path laid in the predetermined external device; and a control unit that when the detecting unit detects start of the coupling, switches the switch to allow to couple, and when the power feed reception terminal is coupled with the power feed reception path laid in the other external device, controls the switch based on result of communication with the other external device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram for explaining the state of FET switches present in the tablet PC and the docking station;

FIG. 4 is a diagram for explaining the state of FET switches present in the tablet PC and the extension unit;

FIG. 6 is a flowchart for explaining a flow of operations performed at the time of establishing a connection in the case in which a power supply is connected only to the tablet PC and not to the docking station; and FIG. 7 is a flowchart for explaining a flow of operations performed at the time of establishment of connection in the case in which a power supply is connected not to the tablet PC but only to the docking station.

DESCRIPTION OF EMBODIMENT

Preferred embodiments of the present invention will be explained with reference to accompanying drawings. However, the information processing device, the extension unit, and the information processing system disclosed herein are not limited to this embodiment.

Figure 1:
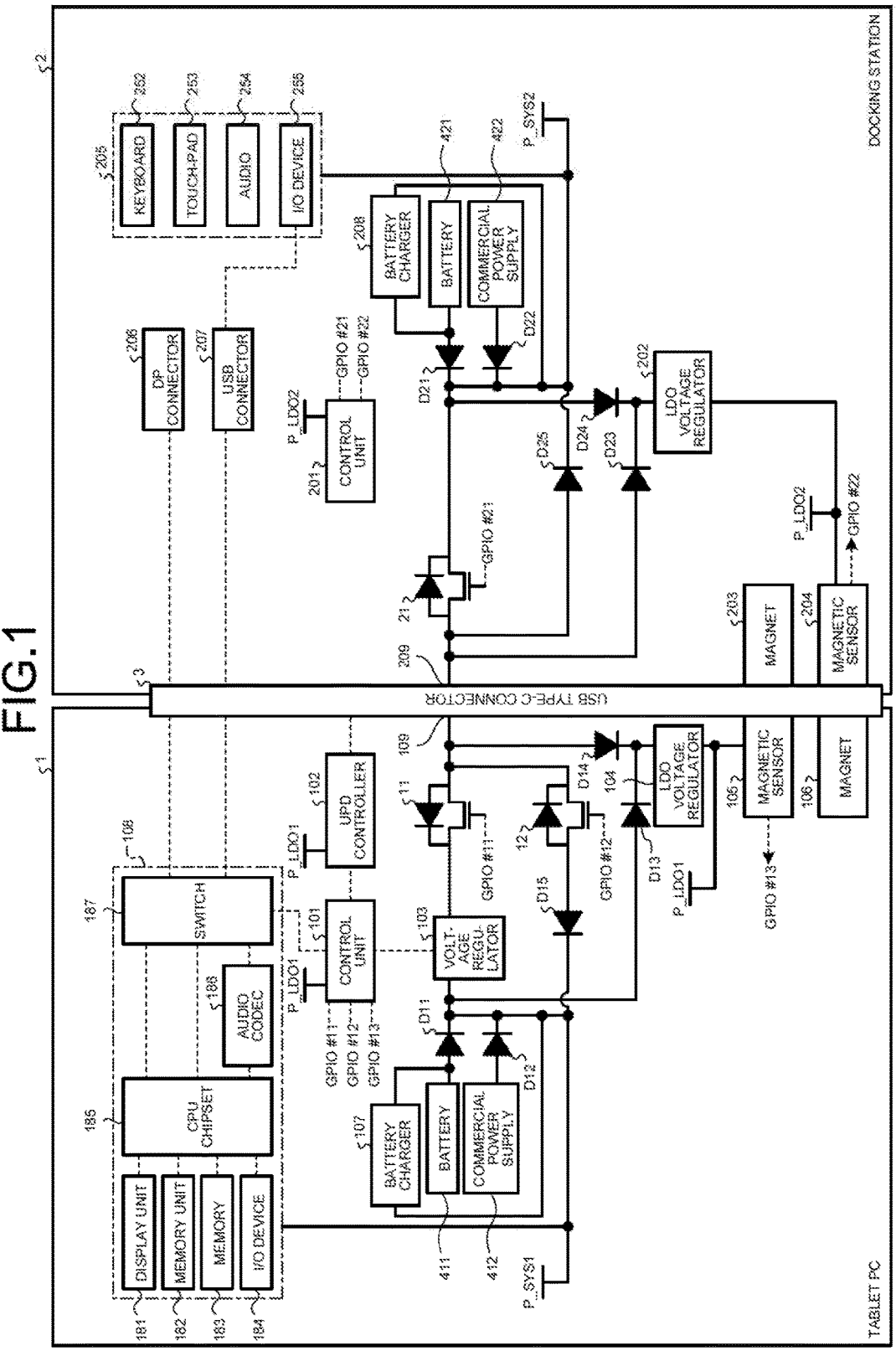
FIG. 1 is a circuit diagram illustrating an overview of the state in which a tablet PC and a docking station according to an embodiment are connected to each other.
Figure 2:
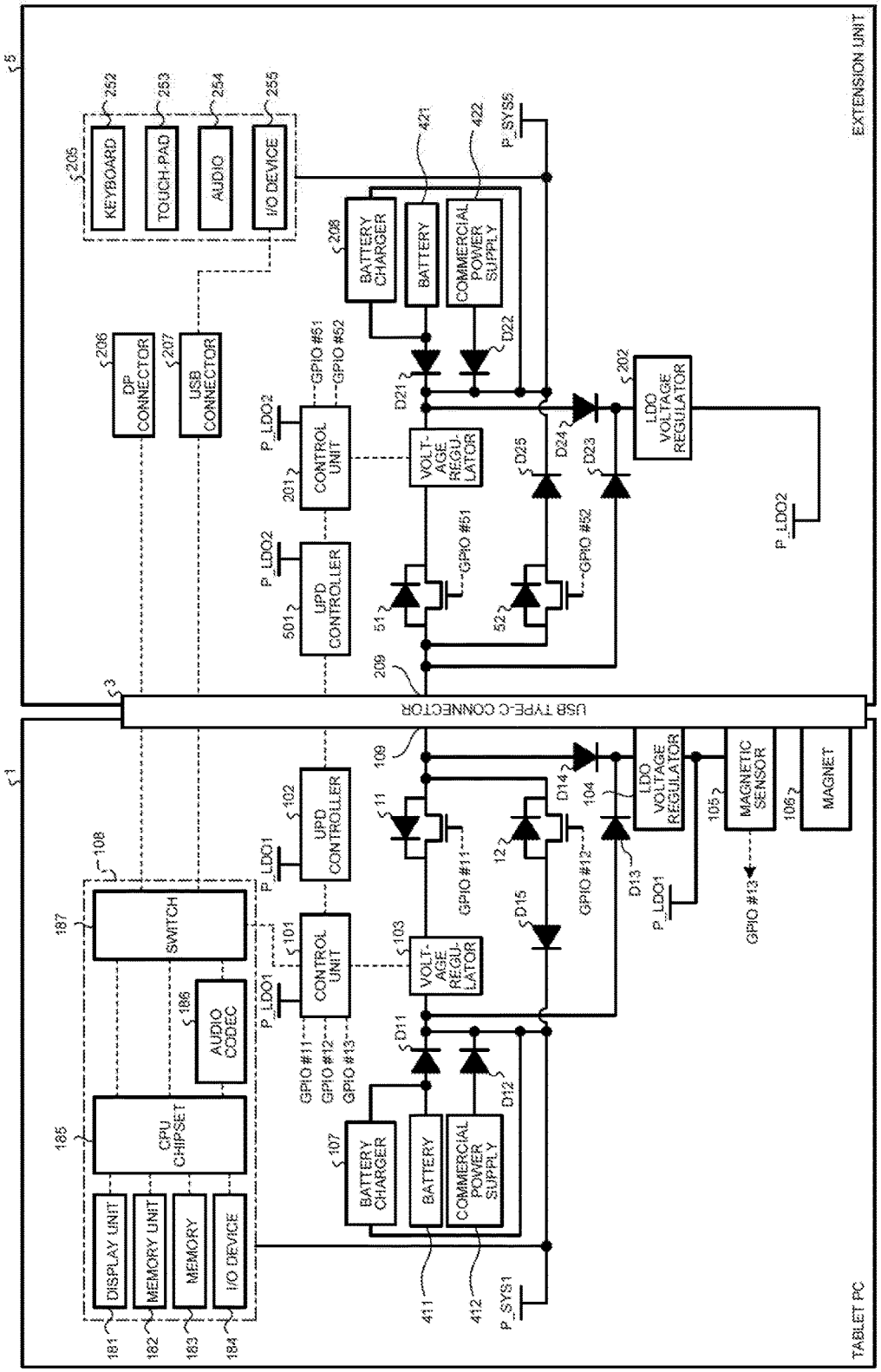
FIG. 2 is a circuit diagram illustrating an overview of the state in which the tablet PC and an extension unit according to the embodiment are connected to each other.

FIG. 1 is a circuit diagram illustrating an overview of the state in which a tablet PC and a docking station according to the embodiment are connected to each other. FIG. 2 is a circuit diagram illustrating an overview of the state in which the tablet PC and an extension unit according to the embodiment are connected to each other. An extension unit 5 illustrated in FIG. 2 is an extension unit of a different type than a docking station 2 illustrated in FIG. 1. More particularly, the docking station 2 is an extension unit in which the connection with a tablet PC 1 is taken into account, while the extension unit 5 is an extension unit in which the connection with the tablet PC 1 is not taken into account. Herein, the tablet PC 1 represents an example of an "information processing device". The docking station 2 represents an example of an "extension unit". The extension unit 5 represents an example of an "other external device".

The tablet PC 1 includes a connector that complies with the USB Type-C standard. Herein, the tablet PC 1 and the docking station 2 are connected to each other by a USB Type-C connector 3 that complies with the USB Type-C standard. Moreover, the tablet PC 1 and the extension unit 5 too are connected to each other by the USB Type-C connector 3. Meanwhile, the tablet PC 1 complies with the UPD standard.

The tablet PC 1 includes a control unit 101, a UPD controller 102, a voltage regulator 103, an LDO voltage regulator 104 (LDO stands for Low Drop Out), a magnetic sensor 105, a magnet 106, a battery charger 107, a processing system 108, and a power feed reception terminal 109. Moreover, the tablet PC 1 gets connected with a battery 411. Furthermore, the tablet PC 1 gets connected with a commercial power supply 412. The battery 411 and the commercial power supply 412 can be inserted in a detachable manner. Herein, the battery 411 and the commercial power supply 412 represent examples of a "power supply" connected to the information processing device. The power feed reception terminal 109 is a power supply terminal that is present in the USB Type-C connector 3 and on the side of the tablet PC 1.

On the path joining the connected battery 411 and the power feed reception terminal 109, a diode D11 is installed that allows passage of electricity from the battery 411 toward the power feed reception terminal 109. Moreover, the output side of the connected commercial power supply 412 is connected to the path joining the battery 411 and the power feed reception terminal 109. Furthermore, in between the commercial power supply 412 and the contact point on the path joining the battery 411 and the power feed reception terminal 109, a diode D12 is installed that allows passage of electricity from the commercial power supply 412 toward the power feed reception terminal 109.

The voltage regulator 103 is installed in between the power feed reception terminal 109 and the contact point of the output side of the diode D11 and the output side of the diode D12. The voltage regulator 103 is a power supply IC capable of varying voltage. The voltage regulator 103 is turned ON in response to an instruction from the control unit 101. Once turned ON, the voltage regulator 103 controls the voltage, which is input from the battery 411 or the commercial power supply 412, to a voltage within a predetermined range.

In between the voltage regulator 103 and the power feed reception terminal 109, a field effect transistor (FET) switch 11 is installed. The FET switch 11 allows passage of electricity from the voltage regulator 103 toward the power feed reception terminal 109. Moreover, the gate of the FET switch 11 is connected to the control unit 101 via a GPIO interface (GPIO stands for General Purpose Input Output). In FIG. 1, it is illustrated that GPIO #11 represents the GPIO interface joining the gate of the FET switch 11 to the control unit 101. The FET switch 11 switches between ON and OFF states in response to instructions from the control unit 101 via the GPIO #11. In the ON state, for example, the FET switch 11 lets the electricity coming from the voltage regulator 103 flow toward the power feed reception terminal 109. At the same time, the FET switch 11 does not allow passage of the opposite direction current from the voltage regulator 103 toward the power feed reception terminal 109. Meanwhile, when not controlled by the control unit 101, the FET switch 11 remains in the OFF state. That is, when the control unit 101 stops operating because of not receiving the delivery of power supply, the FET switch 11 switches to the OFF state. The FET switch 11 represents an example of a "first switch". Moreover, the power feed reception path on which the voltage regulator 103 and the FET switch 11 are installed represents an example of a "first path".

In between the FET switch 11 and the contact point of the output side of the diode D11 and the output side of the diode D12, a diode D15 and an FET switch 12 are installed in parallel with the voltage regulator 103 and the FET switch 11. The FET switch 12 is installed on the side of the power feed reception terminal 109 with respect to the diode D15. Herein, the diode D15 allows passage of electricity from the power feed reception terminal 109 toward the contact point of the output side of the diode D11 and the output side of the diode D12.

The FET switch 12 allows passage of electricity from the power feed reception terminal 109 toward the diode D15. At the same time, the FET switch 11 does not allow passage of the opposite direction current from the voltage regulator 103 toward the diode D15. Moreover, the gate of the FET switch 12 is connected to the control unit 101 via a GPIO interface. In FIG. 1, it is illustrated that GPIO #12 represents the GPIO interface joining the gate of the FET switch 12 to the control unit 101. The FET switch 12 switches between ON and OFF states in response to instructions from the control unit 101 via the GPIO #12. In the ON state, for example, the FET switch 12 lets the electricity coming from the power feed reception terminal 109 flow toward the diode D15. Meanwhile, when not controlled by the control unit 101, the FET switch 12 remains in the OFF state. That is, when the control unit 101 stops operating because of not receiving the delivery of power supply, the FET switch 12 switches to the OFF state. The FET switch 12 represents an example of a "second switch". Moreover, the power feed reception path on which the FET switch 12 and the diode D15 are installed represents an example of a "second path". Furthermore, the FET switches 11 and 12 represent examples of a "first power feed reception switch".

A power feeding path leading to the magnetic sensor 105 extends from an intermediate point between the voltage regulator 103 and the contact point of the output side of the diode D11 and the output side of the diode D12. Moreover, a diode D13 is installed on the power feeding path leading to the magnetic sensor 105. The diode D13 allows passage of electricity from the contact point of the output side of the diode D11 and the output side of the diode D12 toward the magnetic sensor 105.

Moreover, a power feeding path that joins with the output side of the diode D13 extends from an intermediate point between the power feed reception terminal 109 and the contact point of the output side of the FET switch 11 and the input side of the FET switch 12. Moreover, a diode D14 is installed on the power feeding path leading to the output side of the diode D13. The diode D14 allows passage of electricity from the power feed reception terminal 109 toward the magnetic sensor 105.

The LDO voltage regulator 104 is installed in between the magnetic sensor 105 and the contact point of the output side of the diode D13 and the output side of the diode D14. The LDO voltage regulator 104 drops down the voltage, which is sent thereto from the battery 411 or the commercial power supply 412 via the diode D13, to a desired voltage. Besides, the LDO voltage regulator 104 drops down the voltage, which is sent thereto from the docking station 2 via the power feed reception terminal 109 and the diode D14, to a desired voltage.

The magnetic sensor 105 operates upon receiving supply of the electricity output from the LDO voltage regulator 104. The magnetic sensor 105 is connected to the control unit 101 via a GPIO interface. In FIG. 1, it is illustrated that GPIO #13 represents the GPIO interface joining the magnetic sensor 105 and the control unit 101. The magnetic sensor 105 detects the proximity of a magnet 203 that is installed in the docking station 2. Once the proximity of the magnet 203 is detected, the magnetic sensor 105 uses the signal GPIO #13 and notifies the control unit 101 about the start of a connection between the power feed reception terminal 109 and a power feed reception terminal 209. On the other hand, when separation of the magnet 203 is detected, the magnetic sensor 105 uses the signal GPIO #13 and notifies the control unit 101 about the cancellation of the connection between the power feed reception terminals 109 and 209. The magnetic sensor 105 represents an example of a "detecting unit" in the information processing device.

The electrical power output from the LDO voltage regulator 104 is supplied to the control unit 101 and the UPD controller 102. In FIG. 1, it is illustrated that electrical power P_LDO1 output from the LDO voltage regulator 104 is supplied to the control unit 101 and the UPD controller 102.

When the tablet PC 1 is connected to the docking station 2, the magnet 106 is positioned opposite to a magnetic sensor 204 of the docking station 2 (described later).

Meanwhile, from the path joining the contact point of the output side of the diode D11 and the output side of the diode D12 to the output side of the diode D15, a power feeding path leading to the processing system 108 is laid. Moreover, from the power feeding path leading to the processing system 108, the power supply is delivered also to the other systems other than the processing system 108 that are embedded in the tablet PC 1. In FIG. 1, P_SYS1 represents the power supply delivered to the other systems other than the processing system 108.

The output side of the diode D15 is also connected to an intermediate point in between the battery 411 and the diode D11. As a result, the electrical power from the docking station 2 is supplied to the battery 411 via the diode D15. The battery charger 107 is installed in between the output side of the diode D15 and the contact point of the battery 411 and the diode D11. The battery charger 107 converts the voltage, which is output from the docking station 2 and which is supplied via the diode D15, into a charging voltage for charging the battery 411. Then, the battery charger 107 charges the battery 411 using the electrical power supplied from the docking station 2.

The control unit 101 is connected to a switch 187 by a GPIO interface. Moreover, the control unit 101 performs communication with the UPD controller 102 using I2C communication. Moreover, the control unit 101 is connected to the voltage regulator 103 by a system management (SM) bus. Furthermore, the control unit 101 is connected to the FET switch 11 by the GPIO #11. Moreover, the control unit 101 is connected to the FET switch 12 by the GPIO #12. Furthermore, the control unit 101 is connected to the magnetic sensor 105 by the GPIO #13. Moreover, the control unit 101 operates upon receiving the delivery of power supply output from the LDO voltage regulator 104.

When the tablet PC 1 is connected with the docking station 2 as illustrated in FIG. 1, the control unit 101 performs the following operations. When the magnetic sensor 105 detects the proximity of the magnet 203, the control unit 101 receives a notification from the magnetic sensor 105 via the GPIO #13 about the start of a connection between the power feed reception terminals 109 and 209. Upon receiving the notification about the start of a connection between the power feed reception terminals 109 and 209, the control unit 101 detects the connection with the docking station 2. Then, the control unit 101 inputs a switching control signal to the switch 187 via a GPIO interface. More particularly, the control unit 101 stores therein, in advance, the pin arrangement of the USB port, the display port, and the audio port when the connection is established with the docking station 2. In order to ensure that the predetermined pin arrangement is implemented, the control unit 101 uses the switch 187 and switches between the connection path from a CPU chipset 185 to a display port (DP) connector 206 (described later) and the connection path from the CPU chipset 185 to a USB connector 207 (described later), and performs control to output signals to the docking station 2.

Subsequently, the control unit 101 switches the voltage regulator 103 from the OFF state to the ON state. Moreover, the control unit 101 switches the FET switch 11 from the OFF state to the ON state. As a result, if the battery 411 or the commercial power supply 412 is connected, the power supply from the connected battery 411 or the connected commercial power supply 412 gets delivered to the power feed reception terminal 109. That is, unless the proximity of the magnet 203 is detected by the magnetic sensor 105, no voltage is applied to the power feed reception terminal 109.

The control unit 101 switches the FET switch 12 from the OFF state to the ON state. As a result, when the power supply is delivered from the docking station 2, the processing system 108 receives the delivery of power supply from the docking station 2 via the diode D15. Herein, if the battery 411 or the commercial power supply 412 is connected, the processing system 108 receives the delivery of power supply from the connected battery 411 via the diode D11 or from the connected commercial power supply 412 via the diode D12. That is, the processing system 108 receives the delivery of power supply from the battery 411, the commercial power supply 412, or the docking station 2 via the corresponding diode. In this case, the processing system 108 receives power supply delivery from the power supply having the highest voltage from among the battery 411, the commercial power supply 412, and the docking station 2. Moreover, if the voltage of the power supply delivered from the commercial power supply 412 or the docking station 2 is higher than the voltage of the power supply delivered from the battery 411, then the battery 411 is charged using the battery charger 107.

When the tablet PC 1 illustrated in FIG. 2 is connected with the extension unit 5 as illustrated in FIG. 2, the control unit 101 performs the following operations. The control unit 101 reads, via an I2C interface, the communication result including the decided settings from the memory of the UPD controller 102. Then, from the obtained communication result, the control unit 101 obtains the settings including the pin arrangement of the display port, the USB port, the audio port, and the power supply port. Subsequently, the control unit 101 uses the switch 187 and switches between the connections according to the obtained settings.

If the obtained settings indicate that the tablet PC 1 is set to be the supply destination, then the control unit 101 switches the FET switch 11 to the OFF state and switches the FET switch 12 to the ON state. As a result, the power supply gets delivered from the extension unit 5 to the processing system 108 via the power feed reception terminal 109 and the diode D15. On the other hand, the delivery of power supply from the battery 411 or the commercial power supply 412 to the power feed reception terminal 109 is stopped.

The UPD controller 102 performs communication with the control unit 101 using I2C communication. Moreover, the UPD controller 102 performs operations upon receiving the delivery of power supply output from the LDO voltage regulator 104.

When the tablet PC 1 is connected to the docking station 2, since the docking station 2 does not include a UPD controller, the UPD controller 102 switches to the standby state without performing communication using CC signals. Herein, the control unit 101 and the UPD controller 102 represent examples of a "control unit" in the information processing device. Moreover, the control unit 101 represents an example of a "switch control unit", while the UPD controller 102 represents an example of a "communicating unit".

When the tablet PC 1 is connected to the extension unit 5, the UPD controller 102 performs communication using CC signals with a UPD controller 501 of the post-connection extension unit 5 illustrated in FIG. 2; and decides on the settings including the pin arrangement of the display port, the USB port, the audio port, and the power supply port as well as including the direction of the delivery of power supply. Then, the UPD controller 102 stores, in a memory thereof, the communication result including the decided settings.

As illustrated in FIG. 1, for example, the processing system 108 includes a display unit 181, a memory unit 182, a memory 183, an input/output (I/O) device 184, the CPU chipset 185, an audio codec 186, and the switch 187. The processing system 108 performs operations upon receiving the delivery of power supply output from the power supply P_SYS1. Herein, the processing system 108 represents an example of a "load" in the information processing device.

The display unit 181 is a liquid crystal display screen. The memory unit 182 is a hard disk. The memory 183 is the main memory device of the tablet PC 1. The I/O device 184 is an input-output device to be used with peripheral devices.

The CPU chipset 185 is connected to the display unit 181, the memory unit 182, the memory 183, and the I/O device 184 by buses. Moreover, the CPU chipset 185 controls the operations of the display unit 181, the memory unit 182, the memory 183, and the I/O device 184. Furthermore, the CPU chipset 185 has a path for display ports and USB ports laid between itself and the switch 187. Moreover, the CPU chipset 185 has a path for audio ports laid between itself and the switch 187 via the audio codec 186.

The switch 187 switches the connections established between the paths for display ports, USB ports, and audio ports extending from the CPU chipset 185 and the paths extending from the DP connector 206 and the USB connector 207 installed in the docking station 2. When the tablet PC 1 is connected to the docking station 2, the switch 187 receives an instruction for switching to a predetermined USB port, a predetermined display port, and a predetermined audio port from the control unit 101, and switches the paths according to the instruction.

Given below is the explanation about the delivery of power supply to the control unit 101 and the magnetic sensor 105 as well as the explanation about the operations performed based on the delivery of power supply.

The control unit 101 and the magnetic sensor 105 perform operations upon receiving the delivery of power supply output from the LDO voltage regulator 104. If the battery 411 or the commercial power supply 412 is connected, the control unit 101 and the magnetic sensor 105 receive the delivery of power supply from the connected battery 411 or the connected commercial power supply 412 via the diode D13 and the LDO voltage regulator 104, and perform operations. If the battery 411 or the commercial power supply 412 is not connected; when the tablet PC 1 is not yet connected to the docking station 2, then the control unit 101 and the magnetic sensor 105 do not receive the delivery of power supply and stop the operations. Meanwhile, even when the tablet PC 1 is connected to the docking station 2; if the power supply is not delivered to the docking station 2, then the control unit 101 and the magnetic sensor 105 do not receive the delivery of power supply and stop the operations. When the tablet PC 1 is connected to the docking station 2 and when the power supply is delivered to the docking station 2, the control unit 101 and the magnetic sensor 105 receive the delivery of power supply from the docking station 2. More particularly, the control unit 101 and the magnetic sensor 105 receive the delivery of power supply from the docking station 2 via the power feed reception terminal 109, the diode D14, and the LDO voltage regulator 104; and perform operations.

More particularly, when the battery 411 or the commercial power supply 412 is connected, in the state in which the tablet PC 1 is not yet connected to the docking station 2, the magnetic sensor 105 receives the delivery of power supply and performs operations. Thus, when the tablet PC 1 is connected to the docking station 2, the magnetic sensor 105 detects the proximity of the magnet 203 as soon as the docking station 2 moves close to the tablet PC 1. Then, the magnetic sensor 105 notifies the control unit 101 about the start of a connection between the power feed reception terminals 109 and 209. Before the establishment of a connection between the tablet PC 1 and the docking station 2, the control unit 101 receives the notification about the start of a connection between the power feed reception terminals 109 and 209 and switches the voltage regulator 103 and the FET switches 11 and 12 to the ON state.

On the other hand, when the battery 411 or the commercial power supply 412 is not connected; if the docking station 2 has a power supply connected thereto, the control unit 101 and the magnetic sensor 105 receive the delivery of power supply after the tablet PC 1 is connected to the docking station 2. Thus, after the tablet PC 1 is connected to the docking station 2, the magnetic sensor 105 detects the proximity of the magnet 203. That is, after the tablet PC 1 is connected to the docking station 2, the control unit 101 receives, from the magnetic sensor 105, a notification about the start of a connection between the power feed reception terminals 109 and 209. Subsequently, the control unit 101 switches the voltage regulator 103 and the FET switches 11 and 12 to the ON state.

When neither the battery 411 nor the commercial power supply 412 is connected and when no power supply is connected to the docking station 2 too, the control unit 101 and the magnetic sensor 105 does not receive the delivery of power supply under any circumstances. That is, regardless of whether or not the tablet PC 1 and the docking station 2 are connected; the voltage regulator 103 and the FET switches 11 and 12 remain in the OFF state.

Given below is the explanation about the docking station 2. Herein, the docking station 2 includes a control unit 201, an LDO voltage regulator 202, the magnet 203, the magnetic sensor 204, an internal system 205, a DP connector 206, the USB connector 207, a battery charger 208, and the power feed reception terminal 209. Moreover, the docking station 2 gets connected with a battery 421. Furthermore, the docking station 2 gets connected with a commercial power supply 422. The battery 421 and the commercial power supply 422 can be inserted in a detachable manner. Herein, the battery 421 and the commercial power supply 422 represent examples of a "power supply" connected to the extension unit. The power feed reception terminal 209 is a power supply terminal that is present in the USB Type-C connector 3 and on the side of the docking station 2.

On the path joining the connected battery 421 and the power feed reception terminal 209, a diode D21 is installed that allows passage of electricity from the battery 421 toward the power feed reception terminal 209. The output side of the connected commercial power supply 422 is connected to the path joining the battery 421 and the power feed reception terminal 209. In between the commercial power supply 422 and the contact point on the path joining the battery 421 and the power feed reception terminal 209, a diode D22 is installed that allows passage of electricity from the commercial power supply 422 toward the power feed reception terminal 209.

An FET switch 21 is installed in between the power feed reception terminal 209 and the contact point of the output side of the diode D21 and the output side of the diode D22. Moreover, the gate of the FET switch 21 is connected to the control unit 201 via a GPIO interface. In FIG. 1, it is illustrated that GPIO #21 represents the GPIO interface joining the gate of the FET switch 21 with the control unit 201. The FET switch 21 switches between ON and OFF states in response to instructions from the control unit 201. In the ON state, the FET switch 21 lets the electricity coming from the battery 421 or the commercial power supply 422 flow toward the power feed reception terminal 209. Meanwhile, when not controlled by the control unit 201, the FET switch 21 remains in the OFF state. That is, when the control unit 201 stops operating because of not receiving the delivery of power supply, the FET switch 21 switches to the OFF state. The FET switch 21 represents an example of a "switch" and a "second power feed reception switch" in the extension unit.

In between the output side of the FET switch 21 and the contact point of the output side of the diode D21 and the output side of the diode D22, a diode D25 is installed in parallel with the FET switch 21. The diode D25 allows passage of electricity from the power feed reception terminal 209 toward the contact point of the output side of the diode D21 and the output side of the diode D22.

A power feeding path leading to the magnetic sensor 204 extends from an intermediate point between the FET switch 21 and the contact point of the output side of the diode D21 and the output side of the diode D22. Moreover, a diode D24 is installed on the power feeding path leading to the magnetic sensor 204. The diode D24 allows passage of electricity from the contact point of the output side of the diode D21 and the output side of the diode D22 toward the magnetic sensor 204.

Moreover, a power feeding path that joins with the output side of the diode D24 extends from an intermediate point between the power feed reception terminal 209 and the contact point of the input side of the diode D25 and the input side of the FET switch 21. Moreover, a diode D23 is installed on the power feeding path leading to the output side of the diode D24. The diode D23 allows passage of electricity from the power feed reception terminal 209 toward the magnetic sensor 204.

The LDO voltage regulator 202 is installed in between the magnetic sensor 204 and the contact point of the output side of the diode D23 and the output side of the diode D24. The LDO voltage regulator 202 stabilizes the voltage sent thereto from the battery 421 or the commercial power supply 422 via the diode D24. Besides, the LDO voltage regulator 202 drops down the voltage, which is sent thereto from the tablet PC 1 via the power feed reception terminal 209 and the diode D23, to a desired voltage.

The magnetic sensor 204 performs operations upon receiving the supply of electricity output from the LDO voltage regulator 202. The magnetic sensor 204 is connected to the control unit 201 via a GPIO interface. In FIG. 1, it is illustrated that GPIO #22 represents the GPIO interface joining the magnetic sensor 204 with the control unit 201. The magnetic sensor 204 detects the proximity of the magnet 106 installed in the tablet PC 1. Once the proximity of the magnet 106 is detected, the magnetic sensor 204 uses the GPIO #22 and notifies the control unit 201 about the start of a connection between the power feed reception terminals 209 and 109. On the other hand, when separation of the magnet 106 is detected, the magnetic sensor 204 uses the signal GPIO #22 and notifies the control unit 201 about the disengagement of the tablet PC 1 from the docking station 2, that is, about the cancellation of the connection between the power feed reception terminals 109 and 209. The magnetic sensor 204 represents an example of a "detecting unit" in the extension unit.

The electrical power output from the LDO voltage regulator 202 is supplied to the control unit 201. In FIG. 1, it is indicated that electrical power P_LDO2 output from the LDO voltage regulator 202 is supplied to the control unit 201.

When the tablet PC 1 is connected to the docking station 2, the magnet 203 is positioned opposite to the magnetic sensor 105 of the tablet PC 1.

Meanwhile, from the path joining the contact point of the output side of the diode D21 and the output side of the diode D22 to the output side of the diode D25, a power feeding path leading to the internal system 205 is laid. Moreover, from the power feeding path leading to the internal system 205, power supply is delivered also to the other systems other than the internal system 205 that are embedded in the docking station 2. In FIG. 1, P_SYS2 represents the power supply delivered to the other systems other than the internal system 205.

The output side of the diode D25 is also connected to an intermediate point in between the battery 421 and the diode D21. As a result, the electrical power from the tablet PC 1 is supplied to the battery 421 via the diode D25. The battery charger 208 is installed in between the output side of the diode D25 and the contact point of the battery 421 and the diode D21. The battery charger 208 converts the voltage, which is output from the tablet PC 1 and supplied via the diode D25, into a charging voltage for charging the battery 421. Then, the battery charger 208 charges the battery 421 using the electrical power supplied from the tablet PC 1.

The control unit 201 is connected to the gate of the FET switch 21 using the GPIO #21. Moreover, the control unit 201 is connected to the magnetic sensor 204 using the GPIO #22. Furthermore, the control unit 201 performs operations upon receiving the delivery of power supply output from the LDO voltage regulator 202.

When the magnetic sensor 204 detects the proximity of the magnet 106, the control unit 201 receives, from the magnetic sensor 204 via the GPIO #22, a notification about the start of a connection between the power feed reception terminals 109 and 209. Upon receiving the notification about the start of a connection between the power feed reception terminals 109 and 209, the control unit 201 switches the FET switch 21 from the OFF state to the ON state. As a result, when the battery 421 or the commercial power supply 422 is connected, the power supply to the power feed reception terminal 209 is delivered from the connected battery 421 or the connected commercial power supply 422. Thus, unless the proximity of the magnet 106 is detected by the magnetic sensor 204, no voltage is applied to the power feed reception terminal 209. Herein, the control unit 201 represents an example of a "control unit" in the extension unit.

For example, as illustrated in FIG. 1, the internal system 205 includes a keyboard 252, a touch-pad 253, an audio 254, and an input/output (I/O) device 255. The internal system 205 performs operations upon receiving the delivery of power supply output from the battery 421, or the commercial power supply 422, or the tablet PC 1.

Meanwhile, in the docking station 2, no switch is provided for cutting off the power supply input from the power feed reception terminal 209. For that reason, once the tablet PC 1 is connected to the docking station 2, the internal system 205 happens to receive the delivery of power supply from the tablet PC 1 via the diode D25. Moreover, if the battery 421 or the commercial power supply 422 is connected, then the internal system 205 receives the delivery of power supply from the connected battery 421 via the diode D21 or from the connected commercial power supply 422 via the diode D22. That is, the internal system 205 receives the delivery of power supply from the battery 421 or the commercial power supply 422 as well as from the tablet PC 1 via the diodes. In this case, the internal system 205 receives power supply delivery from the power supply having the highest voltage from among the battery 421, the commercial power supply 422, and the tablet PC 1. Moreover, if the voltage of the power supply delivered from the commercial power supply 422 or the tablet PC 1 is higher than the voltage of the power supply delivered from the battery 421, then the battery 421 is charged using the battery charger 208. Herein, the internal system represents an example of a "load" in the extension unit.

Then, the DP connector 206 receives the signals, which are output from the CPU chipset 185, via the switch 187 and the USB Type-C connector 3; and displays the signals.

The USB device present in the I/O device 255 establishes a connection with USB signals. Then, the USB device present in the I/O device 255 receives the signals, which are output from the CPU chipset 185, via the switch 187, the USB Type-C connector 3, and the USB connector 207; and performs operations.

The DP connector 206 is an interface for receiving video signals output from the CPU chipset 185. Thus, the DP connector 206 receives the signals output from the CPU chipset 185.

The USB connector 207 is an interface for receiving USB device control signals that are output from the CPU chipset 185. The USB connector 207 establishes a connection with the USB device present in the I/O device 255 of the internal system 205. Then, the USB connector 207 receives the signals output from the CPU chipset 185 and sends the signals to the USB device present in the I/O device 255.

Given below is the explanation about the delivery of power supply to the control unit 201 and the magnetic sensor 204 as well as the explanation about the operations performed based on the delivery of power supply.

The control unit 201 and the magnetic sensor 204 perform operations upon receiving the delivery of power supply output from the LDO voltage regulator 202. If the battery 421 or the commercial power supply 422 is connected, then the control unit 201 and the magnetic sensor 204 receive the delivery of power supply from the connected battery 411 or the connected commercial power supply 412 via the diode D24 and the LDO voltage regulator 202, and perform operations. When the battery 421 or the commercial power supply 422 is not connected; if the tablet PC 1 is not connected to the docking station 2, then the control unit 201 and the magnetic sensor 204 do not receive the delivery of power supply and stop the operations. Meanwhile, even when the tablet PC 1 is connected to the docking station 2; if power supply is not delivered from the tablet PC 1, then the control unit 201 and the magnetic sensor 204 do not receive the delivery of power supply and stop the operations. When the tablet PC 1 is connected to the docking station 2 and when power supply is delivered from the Tablet PC 1, the control unit 201 and the magnetic sensor 204 receive the delivery of power supply from the Tablet PC 1. More particularly, the control unit 201 and the magnetic sensor 204 receive the delivery of electrical power from the tablet PC 1 via the power feed reception terminal 209, the diode D23, and the LDO voltage regulator 202; and perform operations.

As far as more specific operations are concerned, when the battery 421 or the commercial power supply 422 is connected, in the state in which the tablet PC 1 is not yet connected to the docking station 2, the magnetic sensor 204 receives the delivery of power supply and performs operations. Thus, when the tablet PC 1 is connected to the docking station 2, the magnetic sensor 204 detects the proximity of the magnet 106 as soon as the docking station 2 moves close to the tablet PC 1. Then, the magnetic sensor 204 notifies the control unit 201 about the start of a connection between the power feed reception terminals 109 and 209. Before the establishment of a connection between the tablet PC 1 and the docking station 2, the control unit 201 receives the notification about the start of a connection between the power feed reception terminals 109 and 209 and switches the FET switch 21 to the ON state.

On the other hand, when the battery 421 or the commercial power supply 422 is not connected; if the tablet PC 1 has a power supply connected thereto, the control unit 201 and the magnetic sensor 204 receive the delivery of power supply after the tablet PC 1 is connected to the docking station 2. Thus, after the tablet PC 1 is connected to the docking station 2, the magnetic sensor 204 detects the proximity of the magnet 106. That is, after the tablet PC 1 is connected to the docking station 2, the control unit 201 receives a notification from the magnetic sensor 204 about the start of a connection between the power feed reception terminals 109 and 209. Subsequently, the control unit 201 switches the FET switch 21 to the ON state.

When neither the battery 421 nor the commercial power supply 422 is connected and when no power supply is connected to the tablet PC 1 too, the control unit 201 and the magnetic sensor 204 does not receive the delivery of power supply under any circumstances. That is, regardless of whether or not the tablet PC 1 and the docking station 2 are connected; the FET switch 21 remains in the OFF state.

Given below is the collective explanation about the FET switches 11, 12, and 21 with reference to FIG. 3. Herein, FIG. 3 is a diagram for explaining the state of the FET switches present in the tablet PC and the docking station.

When the tablet PC 1 and the docking station 2 are not connected to each other, all of the FET switches 11, 12, and 21 are in the OFF state. Once the tablet PC 1 and the docking station 2 are connected to each other and when the power supply is delivered from at least one of the battery 411, the commercial power supply 412, the battery 421, and the commercial power supply 422; the state illustrated in the lower part of FIG. 3 is attained. That is, all of the FET switches 11, 12, and 21 switch to the ON state.

The extension unit 5 establishes a connection with the tablet PC 1 using the USB Type-C connector 3. The extension unit 5 includes FET switches 51 and 52. The operations performed by the extension unit 5 at the time of establishing a connection with the tablet PC 1 are identical to the operations performed by an extension unit including a conventional USB Type-C connector. Hence, the operations are not explained herein.

Given below is the collective explanation of the state of the FET switches 11, 12, 51, and 52 with reference to FIG. 4. Herein, FIG. 4 is a diagram for explaining the state of the FET switches present in the tablet PC and the extension unit. Firstly, when the tablet PC 1 and the extension unit 5 are not connected to each other, all of the FET switches 11, 12, 51, and 52 are in the OFF state.

Subsequently, when the tablet PC 1 serves as the supplier of electrical power and the extension unit 5 serves as the supply destination, the FET switches are switched in the following manner. In this case, the FET switch 11 is switched to the ON state, and the FET switch 12 is switched to the OFF state. Moreover, the FET switch 51 is switched to the OFF state, and the FET switch 52 is switched to the ON state.

On the other hand, when the tablet PC 1 serves as the supply destination and the extension unit 5 serves as the supplier of electrical power, the FET switches are switched in the following manner. In this case, the FET switch 11 is switched to the OFF state, and the FET switch 12 is switched to the ON state. Moreover, the FET switch 51 is switched to the ON state, and the FET switch 52 is switched to the OFF state.

When the tablet PC 1 and the extension unit 5 are connected to each other, the supplier of electrical power and the supply destination are determined according to the negotiation between the UPD controllers 102 and 501 by taking into account the connection state of power supplies.

Figure 5:
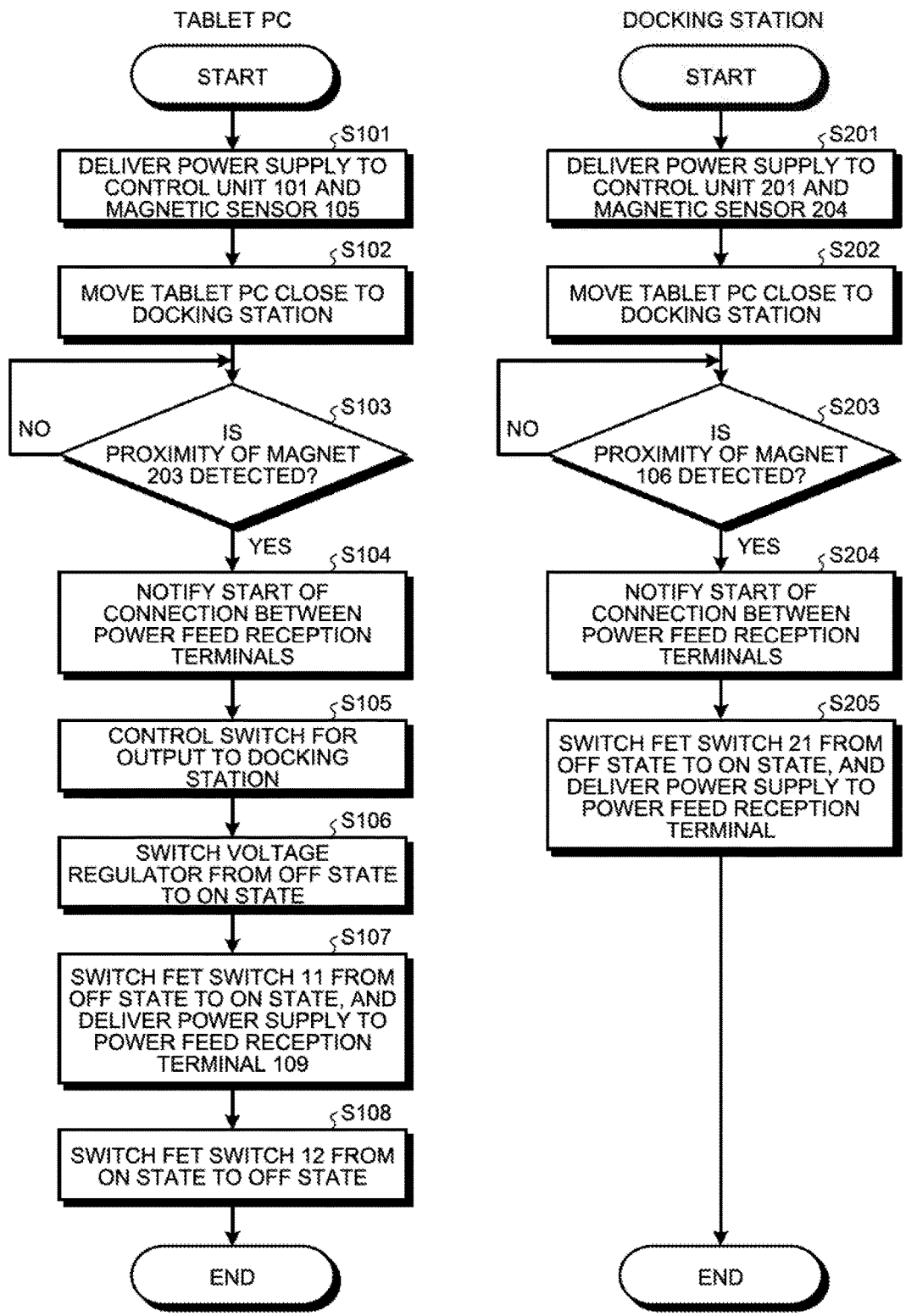
FIG. 5 is a flowchart for explaining a flow of operations performed at the time of establishing a connection in the case in which a power supply is connected to the tablet PC as well as the docking station.

Explained below with reference to FIG. 5 is a flow of operations performed at the time of establishing a connection in the case in which a power supply is connected to the tablet PC 1 as well as the docking station 2. FIG. 5 is a flowchart for explaining a flow of operations performed at the time of establishing a connection in the case in which a power supply is connected to the tablet PC 1 as well as the docking station 2. Herein, the explanation is given for a case in which the battery 411 is connected to the tablet PC 1, and the commercial power supply 422 is connected to the docking station 2.

The following explanation is given about the operations performed in the tablet PC 1. The battery 411 delivers the power supply to the control unit 101 and the magnetic sensor 105 via the diode D13 (Step S101).

The tablet PC 1 is moved close to the docking station 2 for the purpose of establishing a connection (Step S102).

The magnetic sensor 105 determines whether or not the proximity of the magnet 203 is detected (Step S103). If the proximity of the magnet 203 is not detected (No at Step S103), then the magnetic sensor 105 waits until the proximity of the magnet 203 is detected.

When the proximity of the magnet 203 is detected (Yes at Step S103), the magnetic sensor 105 notifies the control unit 101 about the start of a connection between the power feed reception terminals 109 and 209 (Step S104).

The control unit 101 receives a notification from the magnetic sensor 105 about the start of a connection between the power feed reception terminals 109 and 209. Then, the control unit 101 controls the switch 187 for the purpose of an output to the docking station 2 at the predetermined pin count (Step S105).

Subsequently, the control unit 101 switches the voltage regulator 103 from the OFF state to the ON state (Step S106).

Then, the control unit 101 switches the FET switch 11 from the OFF state to the ON state, so that power supply is delivered to the power feed reception terminal 109 from the battery 411 (Step S107).

Subsequently, the control unit 101 switches the FET switch 12 from the OFF state to the ON state (Step S108). As a result, a path for power supply delivery from the docking station 2 to the processing system 108 gets connected.

The following explanation is given about the operations performed in the docking station 2. The commercial power supply 422 delivers the power supply to the control unit 201 and the magnetic sensor 204 via the diode D24 (Step S201).

The tablet PC 1 is moved close to the docking station 2 for the purpose of establishing a connection (Step S202).

The magnetic sensor 204 determines whether or not the proximity of the magnet 106 is detected (Step S203). If the proximity of the magnet 106 is not detected (No at Step S203), then the magnetic sensor 204 waits until the proximity of the magnet 106 is detected.

When the proximity of the magnet 106 is detected (Yes at Step S203), the magnetic sensor 204 notifies the control unit 201 about the start of a connection between the power feed reception terminals 109 and 209 (Step S204).

Then, the control unit 201 switches the FET switch 21 from the OFF state to the ON state, so that the power supply is delivered to the power feed reception terminal 209 from the commercial power supply 422 (Step S205).

Explained below with reference to FIG. 6 is a flow of operations performed at the time of establishing a connection in the case in which a power supply is connected only to the tablet PC 1 and not to the docking station 2. FIG. 6 is a flowchart for explaining a flow of operations performed at the time of establishing a connection in the case in which a power supply is connected only to the tablet PC 1 and not to the docking station 2. In this case, the operations performed by the tablet PC 1 are identical to the flow of operations performed at the time of establishing a connection in the case in which a power supply is connected to the tablet PC 1 as well as the docking station 2 as illustrated in FIG. 5. Hence, that explanation is not repeated.

The docking station 2 neither has the battery 421 connected thereto nor has the commercial power supply 422 connected thereto, and the FET switch 21 is switched to the OFF state because no power supply can be delivered to the control unit 201 and the magnetic sensor 204 (Step S211).

The tablet PC 1 is connected to the docking station 2 for the purpose of establishing a connection (Step S212).

The power supply is delivered to the control unit 201 and the magnetic sensor 204 from the tablet PC 1 via the diode D23, and the operations are started (Step S213).

Since the tablet PC 1 and the docking station 2 are already connected to each other, the magnetic sensor 204 detects the proximity of the magnet 106 (Step S214).

Then, the magnetic sensor 204 notifies the control unit 201 about the start of a connection between the power feed reception terminals 109 and 209 (Step S215).

Subsequently, the control unit 201 switches the FET switch 21 from the OFF state to the ON state (Step S216). As a result, a path for power supply delivery from the battery 421 or the commercial power supply 422 to the power feed reception terminal 209 gets connected.

Then, depending on whether or not the battery 421 or the commercial power supply 422 is connected, the operations vary (Step S217). If the battery 421 or the commercial power supply 422 is not connected (No at Step S217), the connection of the battery 421 or the commercial power supply 422 is awaited.

When the battery 421 or the commercial power supply 422 is connected (Yes at Step S217), the power supply is delivered from the connected battery 421 or the connected commercial power supply 422 to the power feed reception terminal 209 (Step S218).

Explained below with reference to FIG. 7 is a flow of operations performed at the time of establishing a connection in the case in which a power supply is connected not to the tablet PC 1 but only to the docking station 2. FIG. 7 is a flowchart for explaining a flow of operations performed at the time of establishment of connection in the case in which a power supply is connected not to the tablet PC 1 but only to the docking station 2. In this case, the operations performed by the docking station 2 are identical to the flow of operations performed at the time of establishing a connection in the case in which a power supply is connected to the tablet PC 1 as well as the docking station 2 as illustrated in FIG. 5. Hence, that explanation is not repeated.

The tablet PC 1 neither has the battery 411 connected thereto nor has the commercial power supply 412 connected thereto, and the FET switches 11 and 12 are switched to the OFF state because no power supply can be delivered to the control unit 101 and the magnetic sensor 105 (Step S111).

The tablet PC 1 is connected to the docking station 2 for the purpose of establishing a connection (Step S112).

The power supply is delivered to the control unit 101 and the magnetic sensor 105 from the docking station 2 via the diode D14, and the operations are started (Step S113).

Since the tablet PC 1 and the docking station 2 are already connected to each other, the magnetic sensor 105 detects the proximity of the magnet 203 (Step S114).

Then, the magnetic sensor 105 notifies the control unit 101 about the start of a connection between the power feed reception terminals 109 and 209 (Step S115).

The control unit 101 receives the notification from the magnetic sensor 105 about the start of a connection between the power feed reception terminals 109 and 209. Then, the control unit 101 controls the switch 187 for the purpose of an output to the docking station 2 at the predetermined pin count (Step S116).

Then, the control unit 101 switches the voltage regulator 103 from the OFF state to the ON state (Step S117).

Subsequently, the control unit 101 switches the FET switch 11 from the OFF state to the ON state (Step S118). As a result, a path for power supply delivery from the battery 411 and the commercial power supply 412 to the power feed reception terminal 109 gets connected.

Then, the control unit 101 switches the FET switch 12 from the OFF state to the ON state (Step S119). As a result, a path for power supply delivery from the docking station 2 to the processing system 108 gets connected.

Then, depending on whether or not the battery 411 or the commercial power supply 412 is connected, the operations vary (Step S120). If the battery 411 or the commercial power supply 412 is not connected (No at Step S120), the connection of the battery 411 or the commercial power supply 412 is awaited.

When the battery 411 or the commercial power supply 412 is connected (Yes at Step S120), the power supply is delivered from the connected battery 411 or the connected commercial power supply 412 to the power feed reception terminal 109 (Step S121).

Meanwhile, the explanation till now is given for a case in which FET switches are used as the switches for connecting and cutting off the power feeding paths. However, other types of switches can also be used. For example, it is possible to use switches that are integrated circuit (IC) compatible.

In the explanation given above, the start of a connection between power feed reception terminals is detected using magnetic sensors. However, as long as the start of a connection between power feed reception terminals can be detected, it is alternatively possible to use some other members for the detection. For example, it is possible to use proximity sensors. Still alternatively, even in the case in which a power supply is connected to both sides, if there is some margin in the power distribution period; then, after the power feed reception terminals are connected, the start of a connection between the power feed reception terminals can be detected based on the variation in voltage of connection pins.

As described above, in the information processing system according to the embodiment, when a tablet PC is to be connected to a predetermined docking station; a magnetic sensor detects the predetermined docking station, and both sides receive the delivery of power supply from both sides via diodes. Thus, if a power supply is connected to only one of the tablet PC and the docking station, it becomes possible to operate the tablet PC as well as the docking station using that power supply. Moreover, even if there is a change in the direction of delivery of power supply, it becomes possible to continue the delivery of power supply to the tablet PC without disruption.

Meanwhile, when the tablet PC and the predetermined docking station are not connected to each other, the path for power supply delivery to the power feed reception terminals is cut off so that no voltage is applied to the power feed reception terminals. That enables achieving reduction in the occurrence of short circuits.

Moreover, if a device of a different type than the predetermined docking station and complying with the USB Type-C standard or the UPD standard is connected to the tablet PC according to the embodiment, then the control complying with the concerned standard is performed and the device is operated. As a result, while the tablet PC according to the embodiment deals with the device complying with the USB Type-C standard or the UPD standard, the predetermined docking station can be made to continue with the delivery of power supply to the tablet PC without disruption.

According to an aspect of the information processing device, the extension unit, and the information processing system disclosed herein; it becomes possible to continue the delivery of power supply without disruption.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device comprising:
    a diode that allows passage of electricity from a power supply, which is coupled with the information processing device, toward a load;
    a power feed reception terminal that establishes a coupling of the information processing device with a power feed reception path laid in a predetermined external device, wherein the power feed reception terminal allows both electricity to be fed to and from the predetermined external device to pass through;
    a first switch that cuts off or connects a first path on which the electricity to be fed to the predetermined external device flows from an output side of the diode toward the power feed reception terminal;
    a second switch that cuts off or connects a second path on which the electricity to be fed from the predetermined external device via the power feed reception terminal flows toward the load;
    a detecting unit that detects a start of a coupling of the power feed reception terminal with the power feed reception path laid in the predetermined external device; and
    a control unit that switches, when the detecting unit detects the start of the coupling, both of the first switch and the second switch to allow a connection of the first path and a connection of the second path.

2. The information processing device according to claim 1, further comprising a connector that complies with a Universal Serial Bus (USB) Type-C standard and establishes the coupling of the information processing device with the predetermined external device, wherein the connector includes the power feed reception terminal.

3. The information processing device according to claim 1, wherein the control unit includes:
    a communicating unit that, when another external device is coupled, determines a type and direction of signals to be transmitted, and further determines a voltage and direction for power feeding by communicating with the other external device, wherein the other external device is different from the predetermined external device; and
    a switch control unit that controls the switch based on information determined by the communicating unit.

4. The information processing device according to claim 1, wherein each of the first switch and the second switch is a field effect transistor (FET) switch.

5. The information processing device according to claim 1, wherein the detecting unit is a magnetic sensor that detects proximity of a magnet installed in the predetermined external device so as to detect the start of the coupling of the power feed reception terminal with the power feed reception terminal of the predetermined external device.

6. The information processing device according to claim 1, wherein,
    when the power feed reception terminal is coupled with a power feed reception path laid in another external device different from the predetermined external device,
    the control unit switches the first switch to allow the connection of the first path and switches the second switch to allow a cutoff of the second path based on a decision to deliver power supply to the other external device by communicating with the other external device, and the control unit switches the first switch to allow a cutoff of the first path and switches the second switch to allow the connection of the second path based on a decision to receive power supply delivery from the other external device by communicating with the other external device.

7. An extension unit comprising:
a diode that allows passage of electricity from a power supply, which is coupled with the extension unit, toward a load;
a power feed reception terminal that establishes a coupling of the extension unit with a power feed reception path laid in a predetermined external device, the power feed reception terminal allowing both electricity to be fed to and from the predetermined external device to pass through;
a switch that cuts off or connects a path on which the electricity to be fed to the predetermined external device flows from an output side of the diode toward the power feed reception terminal;
a detecting unit that detects a start of a coupling of the power feed reception terminal with the power feed reception path laid in the predetermined external device; and
a control unit that switches, when the detecting unit detects the start of the coupling, the switch to allow a connection of the path.

8. An information processing system comprising:
an information processing device; and
an extension unit; wherein
the information processing device includes:
  a first diode that allows passage of electricity from a first power supply, which is coupled with the information processing device, toward a first load in the information processing device;
  a first power feed reception terminal that establishes a coupling of the information processing device with a power feed reception path laid in the extension unit, wherein the first power feed reception terminal allows both electricity to be fed to and from the extension unit;
  a first power feed reception switch that cuts off or connects a first path and cuts off or connects a second path, wherein the first path is a path on which the electricity to be fed to the extension unit flows from an output side of the first diode toward the first power feed reception terminal, the second path is a path on which the electricity to be fed from the extension unit via the first power feed reception terminal flows toward the load;
  a first detecting unit that detects a start of a coupling of the first power feed reception terminal with a power feed reception path laid in the extension unit; and
  a first control unit that switches, when the first detecting unit detects the start of the coupling, the first power feed reception switch to allow a connection of the first path and a connection of the second path, and
the extension unit includes:
  a second diode that allows passage of electricity from a second power supply, which is coupled with the extension unit, toward a second load in the extension unit;
  a second power feed reception terminal that establishes a coupling with the first power feed reception terminal, wherein the second power feed reception terminal allows both electricity to be fed to and from the information processing device to pass through;
  a second power feed reception switch that cuts off or connects the power feed reception path of the extension unit, on which the electricity to be fed to the information processing device flows from an output side of the second diode toward the second power feed reception terminal;
  a second detecting unit that detects a start of the coupling of the first power feed reception terminal with the second power feed reception terminal; and
  a second control unit that switches, when the second detecting unit detects the start of the coupling, the second power feed reception switch to allow a connection of the power feed reception path of the extension unit.

* * * * *